United States Patent
Shimazaki et al.

(10) Patent No.: US 11,554,493 B2
(45) Date of Patent: Jan. 17, 2023

(54) TRANSFER APPARATUS

(71) Applicant: TOKYO ELECTRON LIMITED, Tokyo (JP)

(72) Inventors: Shota Shimazaki, Nirasaki (JP); Keisuke Kondoh, Nirasaki (JP)

(73) Assignee: TOKYO ELECTRON LIMITED, Tokyo (JP)

( * ) Notice: Subject to any disclaimer, the term of this patent is extended or adjusted under 35 U.S.C. 154(b) by 429 days.

(21) Appl. No.: 16/747,250

(22) Filed: Jan. 20, 2020

(65) Prior Publication Data

US 2020/0230819 A1  Jul. 23, 2020

(30) Foreign Application Priority Data

Jan. 21, 2019 (JP) .............................. JP2019-007414

(51) Int. Cl.
| | | |
|---|---|---|
| *B25J 9/16* | (2006.01) | |
| *B25J 9/10* | (2006.01) | |
| *B25J 13/08* | (2006.01) | |
| *B25J 9/00* | (2006.01) | |
| *B25J 19/06* | (2006.01) | |
| *B25J 15/00* | (2006.01) | |

(52) U.S. Cl.
CPC ........... *B25J 9/1694* (2013.01); *B25J 9/0087* (2013.01); *B25J 9/102* (2013.01); *B25J 9/1674* (2013.01); *B25J 13/087* (2013.01); *B25J 19/06* (2013.01); *B25J 15/0014* (2013.01)

(58) Field of Classification Search
CPC ........ B25J 9/1694; B25J 9/0087; B25J 9/102; B25J 9/1674; G01K 3/005; F16H 57/01
See application file for complete search history.

(56) References Cited

U.S. PATENT DOCUMENTS

| | | | |
|---|---|---|---|
| 9,732,838 B2 * | 8/2017 | McKimpson | ....... F16H 57/0405 |
| 2016/0238462 A1 * | 8/2016 | Geiger | .................. G01K 3/005 |
| 2019/0234892 A1 * | 8/2019 | Harrington | ............. G01K 7/02 |

FOREIGN PATENT DOCUMENTS

| | | | |
|---|---|---|---|
| JP | 2009085423 A | * | 4/2009 |
| JP | 2018-126840 A | | 8/2018 |
| KR | 101439748 B1 | | 9/2014 |
| KR | 1020160054464 A | | 5/2016 |

OTHER PUBLICATIONS

Macine Translation of JP-2009085423-A (Year: 2009).*

* cited by examiner

*Primary Examiner* — Jake Cook
(74) *Attorney, Agent, or Firm* — Nath, Goldberg & Meyer; Jerald L. Meyer; Tanya E. Harkins

(57) ABSTRACT

According to one embodiment of the present disclosure, there is provided a transfer apparatus comprising at least one arm configured to support a substrate; at least one gear disposed at a joint that rotatably supports the at least one arm, the at least one gear rotating the at least one arm; and a detector disposed to face the at least one gear and configured to detect a temperature of the at least one gear without contacting the at least one gear.

9 Claims, 2 Drawing Sheets

US 11,554,493 B2

TRANSFER APPARATUS

CROSS-REFERENCE TO RELATED APPLICATION

This application is based upon and claims the benefit of priority from Japanese Patent Application No. 2019-007414, filed on Jan. 21, 2019, the entire contents of which are incorporated herein by reference.

TECHNICAL FIELD

The present disclosure relates to a transfer apparatus.

BACKGROUND

Patent Document 1 discloses a technology that forcibly cools actuators of joints by using a refrigerant channel formed in a multi-joint robot.

PRIOR ART DOCUMENTS

Patent Documents

Patent Document 1: Japanese Laid-open Publication No. 2018-126840

SUMMARY

According to one embodiment of the present disclosure, there is provided a transfer apparatus comprising at least one arm configured to support a substrate; at least one gear disposed at a joint that rotatably supports the at least one arm, the at least one gear rotating the at least one arm; and a detector disposed to face the at least one gear and configured to detect a temperature of the at least one gear without contacting the at least one gear.

BRIEF DESCRIPTION OF DRAWINGS

The accompanying drawings, which are incorporated in and constitute a part of the specification, illustrate embodiments of the present disclosure, and together with the general description given above and the detailed description of the embodiments given below, serve to explain the principles of the present disclosure.

DETAILED DESCRIPTION

Reference will now be made in detail to various embodiments, examples of which are illustrated in the accompanying drawings. In the following detailed description, numerous specific details are set forth in order to provide a thorough understanding of the present disclosure. However, it will be apparent to one of ordinary skill in the art that the present disclosure may be practiced without these specific details. In other instances, well-known methods, procedures, systems, and components have not been described in detail so as not to unnecessarily obscure aspects of the various embodiments.

Hereafter, an embodiment of a transfer apparatus that is proposed in the present disclosure is described in detail with reference to drawings. In addition, the disclosed transfer apparatus is not limited by the embodiment.

In general, in the manufacturing of semiconductors, substrates such as a semiconductor wafer (hereafter, referred to also as a "wafer") are transferred into a chamber of a substrate processing apparatus by a transfer apparatus. The transfer apparatus may include an arm and/or a joint for rotating the arm. For example, there is a multi-joint robot as the transfer apparatus. The multi-joint robot includes a gear at the joint and drives the joint by transmitting a driving force from a motor to the gear at the joint.

A tolerance range of temperature is predetermined in the multi-joint robot depending on a specifications, etc., and abnormality may be generated in the multi-joint robot when a temperature exceeds the tolerance range. The multi-joint robot transfers wafers into and out of a high-temperature chamber in some cases, so a temperature of the arm easily increases. In addition, since the joint are driven in the multi-joint robot, a temperature of the gear of the joint easily further increases due to heat generation. However, since the gear is rotated, it is difficult to directly measure the temperature of the gear by disposing temperature sensors such as a thermocouple. Accordingly, for example, temperature sensors such as a thermocouple are disposed on a housing of the arm in the multi-joint robot, and the temperature is indirectly measured through the housing. However, since the housing has a large area, the responsiveness to the temperature is low. Accordingly, when the temperature of the housing increases, the temperature of the gear at the joint increases beyond the tolerance range in some cases. Therefore, there is a need to directly measure the temperature of the gear at the joint.

[Configuration of Apparatus]

Figure 1:
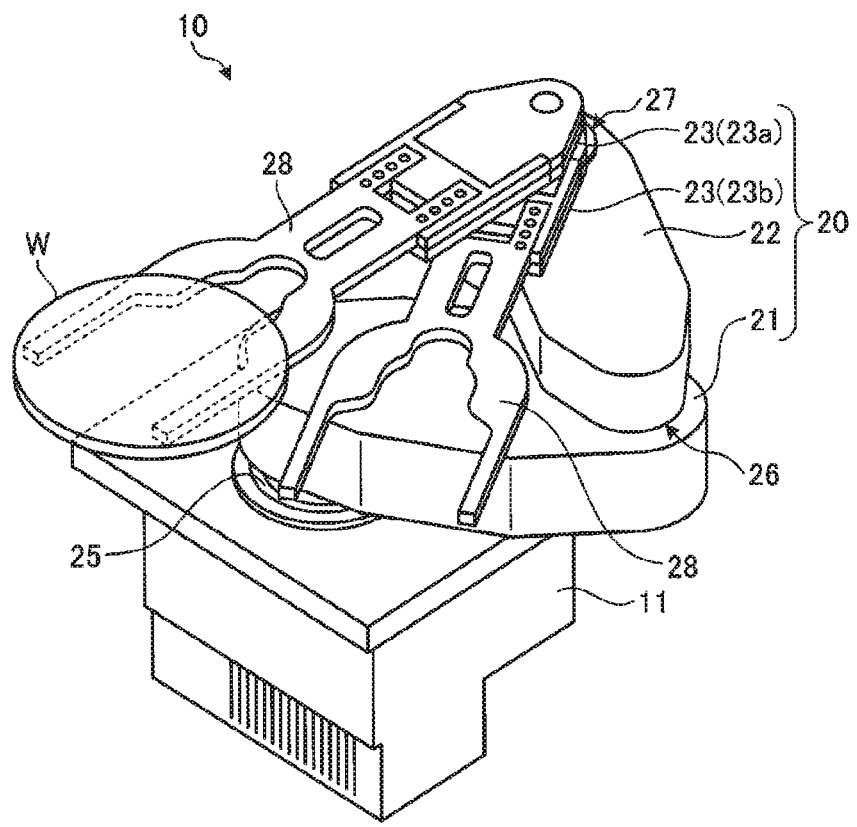
FIG. 1 is a perspective view showing an example of the configuration of a transfer apparatus according to an embodiment.

An example of the configuration of the transfer apparatus according to an embodiment is described. In the present embodiment, the multi-joint robot is exemplified as the transfer apparatus in the following description. FIG. 1 is a perspective view showing an example of the configuration of the transfer apparatus according to an embodiment.

The transfer apparatus 10 has a base 11 and an arm assembly 20. The base 11 supports the arm assembly 20. The arm assembly 20 is disposed rotatably on the base 11.

The arm assembly 20 is composed of multi-joint arms formed by connecting a plurality of arms to at least one joint. The arm assembly 20 according to the present embodiment includes a first arm 21, a second arm 22, and a third arm 23.

A first end portion of the first arm 21 and a first joint 25 rotatably supporting the first arm 21 are disposed on the base 11. A first end portion of the second arm 22 and a second joint 26 rotatably supporting the second arm 22 are disposed at a second end portion of the first arm 21. A first end portion of the third arm 23 and a third joint 27 rotatably supporting the third arm 23 are disposed at a second end portion of the second arm 22.

In the transfer apparatus 10 according to the present embodiment, two third arms 23 are provided, and first end portions of the third arms 23 are supported and overlap each other at the third joint 27. Hereafter, in order to discriminate the two third arms 23, one of the two third arms 23 at an upper position is referred to an upper arm 23a and the other of the two third arms 23 at a lower position is referred to a lower arm 23b.

A peak 28 is formed at a second end portion of each of the upper arm 23a and the lower arm 23b. The peak 28 is divided into two parts at a front end portion and a wafer W is loaded on the peak 28. In the example shown in FIG. 1, the wafer W is loaded on the peak 28 of the upper arm 23a.

A gear and a motor that rotatably support the first arm 21 are disposed at the first joint 25, and the gear is rotated by a driving force from the motor, so as to rotate the first arm. A gear and a motor that rotatably support the second arm 22 are disposed at the second joint 26, and the gear is rotated by a driving force from the motor, so as to rotate the second arm 22. Gears and motors, which rotatably support the upper arm 23a and the lower arm 23b respectively, are disposed at the third joint 27, and the gears are rotated by driving forces from the motors, so as to respectively rotate the upper arm 23a and the lower arm 23b. When contracting the arm assembly 20, the transfer apparatus 10 rotates the first arm 21, the second arm 22 and the third arm 23 using the first joint 25, the second joint 26 and the third joint 27.

Figure 2:
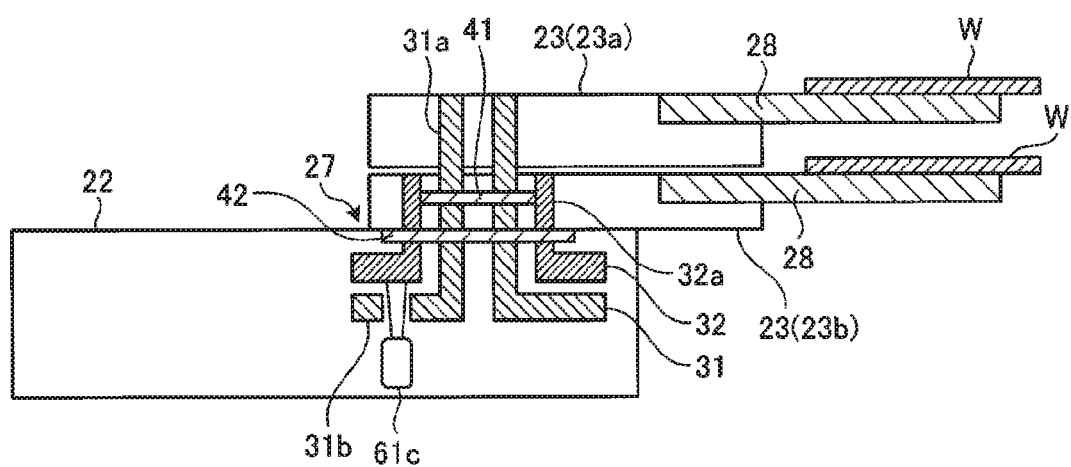
FIG. 2 is a view showing an example of a schematic configuration of an actuator of a third joint according to an embodiment.

Actuators of the first joint 25, the second joint 26 and the third joint 27 have similar structure. Hereafter, a structure of an actuator of the third joint 27 is representatively described. FIG. 2 is a view showing an example of a schematic configuration of the actuator of the third joint according to an embodiment.

The upper arm 23a and the lower arm 23b overlap each other at the third joint 27 of the second arm 22. A first gear 31 and a second gear 32 coaxially overlap each other up and down at the third joint 27. In addition, various gears and motors that respectively drive the first gear 31 and the second gear 32 are omitted in FIG. 2.

A shaft 31a that is a rotary shaft of the first gear 31 is provided. The shaft 31a extends up to the upper arm 23a. The upper arm 23a is fixed to the shaft 31a. The upper arm 23a is rotated about the shaft 31a by rotation of the first gear 31. A shaft 32a that is a rotary shaft of the second gear 32 is provided. The shaft 32a is a hollow shaft and the shaft 31a is inserted in the shaft 32a. The shaft 32a extends up to the lower arm 23b. The lower arm 23b is fixed to the shaft 32a. The lower arm 23b is rotated about the shaft 32a by rotation of the second gear 32.

The arm assembly 20 of the transfer apparatus 10 according to the present embodiment is used in a vacuum atmosphere. For example, a top surface of the base 11 of the transfer apparatus 10 constitutes a wall of a transfer chamber having a predetermined degree of vacuum and the arm assembly 20 is disposed in the transfer chamber. A load lock chamber or a chamber of the substrate processing apparatus is connected to the transfer chamber through a gate valve. A portion between the load lock chamber or the chamber of the substrate processing apparatus and the transfer chamber can be hermetically closed and opened by the gate valve. A wafer W is transferred into the load lock chamber from an outside first. When a pressure in the load lock chamber is decreased to a predetermined degree of vacuum, the gate valve between the load lock chamber and the transfer chamber is opened. The transfer apparatus 10 takes out the wafer W from the load lock chamber through the gate valve using the arm assembly 20. The transfer apparatus 10 transfers the wafer W into the chamber of the substrate processing apparatus using the arm assembly 20. The substrate processing apparatus performs substrate processing such as film-forming or etching on the wafer W. As described above, the arm assembly 20 of the transfer apparatus 10 is used in a vacuum atmosphere.

In the transfer apparatus 10, an inside of the base 11 and the arm assembly 20 are at an atmospheric pressure and are hermetically closed to prevent leakage of an air therein. For example, a vacuum seal 41 is disposed between the shaft 31a and the shaft 32a at the third joint 27 and a vacuum seal 42 is disposed around the shaft 32a, so that they are sealed.

However, the transfer apparatus 10 may transfer in and out wafers W using the arm assembly 20 for a high-temperature chamber in some cases, so a temperature of the arm assembly 20 easily increases due to heat transmitted from the chamber or the wafers W. In particular, since the upper arm 23a, the lower arm 23b, and the third joint 27 are positioned at a front end portion of the arm assembly 20 and heat easily transfers from a high-temperature chamber or a wafer W to the upper arm 23a, the lower arm 23b, and the third joint 27, temperatures of the upper arm 23a, the lower arm 23b, and the third joint 27 easily increase. In addition, when the transfer apparatus 10 contracts the arm assembly 20, heat is generated by friction, etc. at the gears of the first joint 25, the second joint 26 and the third joint 27, so temperatures of the upper arm 23a, the lower arm 23b, and the third joint 27 easily increase. For example, temperatures of the first gear 31 and the second gear 32 easily increase at the third joint 27. As described above, a temperature of the arm assembly 20 of the transfer apparatus 10 easily increases. In particular, temperatures of the first gear 31 and the second gear 32 at the third joint 27 more easily increase due to a heat transfer from a chamber or a wafer W or a heat generated by the gears.

However, the transfer apparatus 10 may not maintain airtightness at high temperature. For example, bearings or sealing members for the vacuum seal 41 and the vacuum seal 42 may not maintain airtightness at high temperature.

Therefore, in the transfer apparatus 10 according to the present embodiment, detectors that detect temperatures of the gears without contacting the gears are provided respectively to face the gears of the first joint 25, the second joint 26 and the third joint 27. The detectors are disposed to face end surfaces of the gears at the first joint 25, the second joint 26 and the third joint 27 and detect temperatures of the end surfaces of the gears, which they face respectively, without contacting the gears. For example, at the third joint 37, a detector 61c is disposed under the first gear 31 at a lower position of the first gear 31 and the second gear 32 overlapping each other. The detector 61c is disposed at a position, which is biased from a rotational center of the first gear 31 and is inside a circumference of the first gear 31, and faces the end surface of the first gear 31. The detector 61c is, for example, a radiation thermometer and measures a temperature of an object by measuring the intensity of infrared light or visible light.

Figure 3:
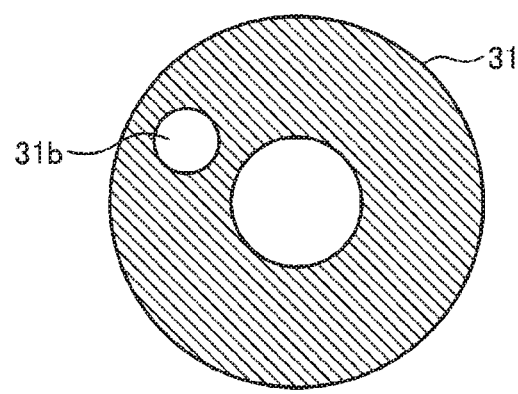
FIG. 3 is a view showing a schematic configuration of a first gear according to an embodiment.

The first gear 31 has a transmission portion that transmits infrared light or visible light. FIG. 3 is a view showing a schematic configuration of a first gear according to an embodiment, and is a plan view schematically showing the end surface of the first gear 31 from a lower side. The first gear 31 has a through-hole 31b that is the transmission portion. The through-hole 31b of the first gear is formed at a position that faces the detector 61c when the upper arm 23a is at a predetermined rotational position. The predetermined rotational position is, for example, a rotational position where the upper arm 23a overlaps the second arm 22. For example, the through-hole 31b is formed at a position, which is biased from the rotational center of the first gear 31 and is inside the circumference of the first gear 31, to correspond to the detector 61*c*. In addition, the predetermined rotational position is not limited to the rotational position where the upper arm 23*a* overlaps the second arm 22 and may be any rotational position as long as the rotational position does not interfere with a surrounding or other devices.

The detector 61*c* detects a temperature of the first gear 31 when the upper arm 23*a* is not at the predetermined rotational position. In addition, when the upper arm 23*a* is at the predetermined rotational position, the detector 61*c* detects a temperature of the second gear 32 through the through-hole 31*b* of the first gear 31. For example, when the predetermined rotational position is a rotational position where the upper arm 23*a* overlaps the second arm 22, the detector 61*c* detects the temperature of the first gear 31 when the upper arm 23*a* is not at the rotational position where it overlaps the second arm 22. In addition, when the upper arm 23*a* is at the rotational position where it overlaps the second arm 22, the detector 61*c* detects the temperature of the second gear 32 through the through-hole 31*b* of the first gear 31. For example, the detector 61*c* detects the temperature of the second gear 32 through the through-hole 31*b* of the first gear 31 in FIG. 2.

As described above, the transfer apparatus 10 according to the present embodiment can directly detect the temperatures of the first gear 31 and the second gear 32, which easily become high, by the detector 61*c*. In addition, the transfer apparatus 10 can detect the temperatures of the first gear 31 and the second gear 32 using one detector 61*c*.

Figure 4:
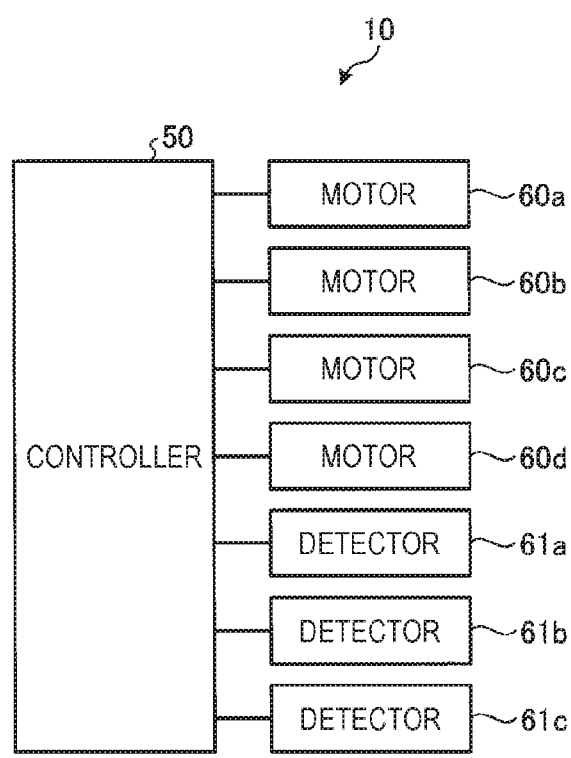
FIG. 4 is a view schematically showing the configuration of a controller of a transfer apparatus according to the embodiment.

Next, a configuration of a controller that controls the operation of the transfer apparatus 10 according to the present embodiment is described. FIG. 4 is a view schematically showing the configuration of the controller of the transfer apparatus according to the embodiment.

The operation of the transfer apparatus 10 having the configuration described above is generally controlled by a controller 50. The controller 50 is, for example, a computer. The controller 50, for example, may be disposed inside or the outside the base 11.

The motors that drive components of the transfer apparatus 10 are connected to the controller 50. For example, motors 60*a* to 60*d* are connected to the controller 50. The motor 60*a* is disposed at the first joint 25 and rotates the gear disposed at the first joint 25, so as to rotate the first arm 21. The motor 60*b* is disposed at the second joint 26 and rotates the gear disposed at the second joint 26, so as to rotate the second arm 22. The motor 60*c* is disposed at the third joint 27 and rotates the first gear 31 disposed at the third joint 27, so as to rotate the upper arm 23*a*. The motor 60*d* is disposed at the third joint 27 and rotates the second gear 32 disposed at the third joint 27, so as to rotate the lower arm 23*b*.

The controller 50 controls rotations of the first arm 21, the second arm 22 and the third arm 23 by controlling operations of the motors 60*a* to 60*d*. For example, the controller 50 controls the arm assembly 20 to transfer a new wafer W into the chamber of the substrate processing apparatus using the upper arm 23*a*. In addition, the controller 50 controls the arm assembly 20 to transfer out a wafer W, which has undergone substrate processing, from the chamber of the substrate processing apparatus using the lower arm 23*b*. As described above, since the new wafer W and the wafer W that has undergone substrate processing are transferred by the upper arm 23*a* and the lower arm 23*b*, respectively, it is possible to prevent particles, etc. produced in the substrate processing from sticking to the new wafer W through the arm assembly 20.

The controller 50 receives various information inputs from the arm assembly 20. For example, the controller 50 receives temperature information inputs from the detectors 61*a* to 61*c*. The detector 61*a* is disposed at the first joint 25 and detects the temperature of the gear at the first joint 25 without contacting the gear at the first joint 25. The detector 61*b* is disposed at the second joint 26 and detects the temperature of the gear at the second joint 26 without contacting the gear at the second joint 26. The detector 61*c*, as shown in FIG. 2, is disposed at the third joint 27 and detects the temperature of the first gear 31 without contacting the first gear 31 or the temperature of the second gear 32 without contacting the second gear 32. When detecting the temperature of the first gear 31, the controller 50 controls the upper arm 23*a* to move to a rotational position that is not the rotational position where the upper arm 23*a* overlaps the second arm 22. In this manner, the detector 61*c* can detect the temperature of the first gear 31. When detecting the temperature of the second gear 32, the controller 50 controls the upper arm 23*a* to move to the rotational position where the upper arm 23*a* overlaps the second arm 22. In this manner, the detector 61*c* can detect the temperature of the second gear 32.

The controller 50 determines whether the temperature of the arm assembly 20 is in a tolerance range on a basis of temperature information inputs from the detectors 61*a* to 61*c*. For example, the controller 50 determines whether the temperature information inputs from the detectors 61*a* to 61*d* are in the tolerance range. The vacuum seal 41 is fixed to the shaft 32*a* of the second gear 32 in contact with the shaft 31*a* of the first gear 31, so as to seal an actuator that rotates the shaft 31*a*. The vacuum seal 42 is fixed to a housing of the second arm 22 in contact with the shaft 32*a* of the second gear 32, so as to seal an actuator that rotates the shaft 32*a*. Heat of the first gear 31 and heat of the second gear 32 transfer to the vacuum seal 41 and 42 through the shaft 31*a* of the first gear 31 and the shaft 32*a* of the second gear 32. Accordingly, it is possible to consider the temperatures of the first gear 31 and the second gear 32 as temperatures of the vacuum seals 41 and 42, respectively, by measuring the temperatures of the first gear 31 and the second gear 32. That is, the temperatures of the first gear 31 and the second gear 32 can be considered as the temperatures of the vacuum seal 41 and the vacuum seal 42, respectively. Accordingly, it is possible to determine whether the temperatures of the vacuum seal 41 and the vacuum seal 42 are in the tolerance range by determining whether the temperatures of the first gear 31 and the second gear 32 are in the tolerance range. For example, when a new wafer W is transferred into the chamber of the substrate processing apparatus by the upper arm 23*a*, the controller 50 detects the temperature of the first gear 31 through the detector 61*c*. On the other hand, when a wafer W that has undergone substrate processing is transferred out of the chamber of the substrate processing apparatus by the lower arm 23*b*, the controller 50 controls the upper arm 23*a* to move to the rotational position where it overlaps the second arm 22, so the detector 61*c* detects the temperature of the second gear 32. The controller 50 determines whether the detected temperatures of the first gear 31 and the second gear 32 exceed the tolerance range.

The controller 50 outputs a warning when a temperature of any gear exceeds the tolerance range. For example, the controller 50 outputs a warning at an operation panel for operating the transfer apparatus 10. Accordingly, a manager who manages the transfer apparatus 10 can recognize that there is a possibility of abnormality in the transfer apparatus 10 from the warning output on the operation panel.

As described above, since the transfer apparatus 10 according to the present embodiment can find out temperatures of the gears at the first joint 25, the second joint 26, and the third joint 27 from the temperature information inputs that are input from the detectors 61a to 61c, it is possible to determine whether there is a possibility of abnormality. For example, magnetic fluid that is used for vacuum seals such as the vacuum seals 41 and 42 has a high possibility of leakage when demagnetization occurs due to heat. In addition, vacuum seals are hardened or softened due to heat, so the possibility of leakage increases. When the air leaks from the vacuum seals in the transfer apparatus 10, it may act as a risk that causes generation of particles. Accordingly, the vacuum seals are provided to suppress a temperature within a use temperature range. Since the transfer apparatus 10 can find out the temperatures of vacuum seals such as the vacuum seals 41 and 42 by finding out the temperatures of the first joint 25, the second joint 26, and the third joint 27, it can be determined whether there is a possibility of leakage from the vacuum seals. In addition, the transfer apparatus 10 can quickly sense an increase in friction temperature due to insufficiency of grease of the gears at the first joint 25, the second joint 26, and the third joint 27 or deterioration of the vacuum seals, and an increase in heat transfer from a chamber, etc., so it is possible to prevent deterioration or breakage of the vacuum seals due to heat.

The substrate processing apparatus may process substrates at high temperature. However, when the transfer apparatus 10 transfers wafers W using the arm assembly 20 into or out of a high-temperature chamber, heat transfers from the chamber or the wafers W, so a temperature of the arm assembly 20 easily increases. In addition, the arm assembly 20 of the transfer apparatus 10 may temporarily stop in a high-temperature chamber due to abnormality. In this case, the temperature of the arm assembly 20 easily increase.

Even in this case, the transfer apparatus 10 can recognize an influence on the arm assembly 20 from heat of a chamber or a wafer W of high temperature by detecting the temperatures of the gears at the first joint 25, the second joint 26 and the third joint 27 and determining whether the detected temperatures of the gears exceed the tolerance range.

When the temperature of any of the gears at the first joint 25, the second joint 26, and the third joint 27 does not exceed the tolerance range, the controller 50 keeps the transfer apparatus 10 operating. Accordingly, it is possible to prevent a semiconductor manufacturing process from being stopped due to abnormality in the transfer apparatus 10. Meanwhile, the controller 50 outputs a warning when the temperature of any gear exceeds the tolerance range. Therefore, it is possible to warn of a possibility of abnormality in the transfer apparatus 10.

In addition, when a temperature of one gear exceeds the tolerance range, the controller 50 may control the arm assembly 20 to stop one arm that is rotated by the one gear and transfer a substrate with another arm instead of the one arm. For example, when the temperature of the first gear 31 exceeds the tolerance range, the controller 50 may control the upper arm 23a to stop and the lower arm 23b to transfer a new wafer W into the chamber of the substrate processing apparatus and to transfer a wafer W that has undergone substrate processing out of the chamber. In addition, when the temperature of the second gear 32 exceeds the tolerance range, the controller 50 may control the lower arm 23b to stop and the upper arm 23a to transfer a new wafer W into the chamber of the substrate processing apparatus and to transfer a wafer W that has undergone substrate processing out of the chamber. Accordingly, since the transfer apparatus 10 according to the present embodiment can stop a gear of which the temperature exceeds the tolerance range, it is possible to suppress a further increase in a temperature of the gear. In addition, the transfer apparatus 10 according to the present embodiment can suppress stagnation of wafers W that are being transferred.

As described above, the transfer apparatus 10 according to the present embodiment includes arms (the first arm 21, the second arm 22, and the third arm 23), gears (the first gear 31 and the second gear 32), and detectors (the detectors 61a to 61c). The arms support a substrate (wafer W). The gears are disposed at joints (the first joint 25, the second joint 26, and the third joint 27) that rotatably support the arms and rotate the arms. The detectors are disposed to face the gears and detect the temperatures of the gears without contacting the gears. Accordingly, the transfer apparatus 10 according to the present embodiment can directly measure the temperatures of the gears at the joints.

In addition, the arms are hermetically configured in the transfer apparatus 10. The joints are sealed by vacuum seals (e.g., the vacuum seals 41 and 42) disposed on the shafts of the gears. Accordingly, the transfer apparatus 10 according to the present embodiment can estimate the temperatures of the gears as the temperatures of the vacuum seals, so it is possible to estimate whether the temperatures of the vacuum seals are in a tolerance range. In addition, the transfer apparatus 10 according to the present embodiment can quickly sense an increase in friction temperature due to insufficiency of grease of the gears at the joints and an increase in heat transfer from a chambers, etc., so it is possible to prevent deterioration or breakage of the vacuum seals due to heat.

In addition, the transfer apparatus 10 includes the upper arm 23a and the lower arm 23b. The end portions of the upper arm 23a and the lower arm 23b are supported to overlap each other at the third joint 27. The first gear 31 and the second gear 32 are coaxially disposed to respectively correspond to the upper arm 23a and the lower arm 23b. The first gear 31 and the second gear 32 respectively rotate the upper arm 23a and the lower arm 23b. The first gear 31 has the through-hole 31b. The detector 61c is disposed at the first gear 31 to face the first gear 31, so as to detect the temperature of the first gear 31 at a portion where the through-hole 31b is not formed and detect the temperature of the second gear 32 through the through-hole 31b of the first gear 31. Accordingly, the transfer apparatus 10 according to the present embodiment can directly detect the temperatures of the first gear 31 and the second gear 32 by the detector 61c. Therefore, it is possible to reduce the number of detectors for detecting the temperatures of the gears in the transfer apparatus 10 according to the present embodiment, so it is possible to reduce a space and a cost for the arms.

In addition, the through-hole 31b of the first gear is formed at a position that faces the detector 61c when the upper arm 23a is positioned at a predetermined rotational position by rotation. When the temperature of the second gear 32 is detected, the controller 50 controls the upper arm 23a to move to the predetermined rotational position. Accordingly, the transfer apparatus 10 according to the present embodiment can detect the temperature of the second gear 32 through the through-hole 31b of the first gear 31 using the detector 61c.

In addition, the controller 50 outputs the warning when a temperature of a gear detected by a detector exceeds the tolerance range. Accordingly, the transfer apparatus 10 according to the present embodiment can notify a possibility of abnormality.

In addition, when a temperature of one gear detected by a detector exceeds the tolerance range, the controller 50 controls one arm that is rotated by the one gear to stop and another arm to transfer a substrate instead of the one arm. Accordingly, since the transfer apparatus 10 according to the present embodiment can stop a gear of which the temperature exceeds the tolerance range, it is possible to suppress a further increase in temperature of the gear. In addition, the transfer apparatus 10 according to the present embodiment can suppress stagnation of a substrate that is being transferred.

In addition, the detector 61c is disposed to face the end surface of the first gear 31 and detects the temperature of the end surface of the first gear 31 without contacting the end surface. Accordingly, in the transfer apparatus 10 according to the present embodiment, the detector 61c measures the temperature of the end surface that is a flat surface rather than the toothed portions of the first gear, by a radiation thermometer, so it is possible to stably measure the temperature.

Although embodiments were described above, the embodiments disclosed herein should be construed as only examples, not limiting, in all terms. Actually, the above embodiments may be implemented in various ways. The embodiments described above may be omitted, replaced, and changed in various ways without departing from the accompanying claims and the subject thereof.

For example, in the embodiment, although a wafer W is exemplified as a substrate, the present disclosure is not limited thereto. The substrate may be, for example, selected from other substrates such as a rectangular glass substrate.

In addition, in the embodiment, it was exemplified that a warning is output when a temperature of any gear exceeds the tolerance range, but the present disclosure is not limited thereto. For example, the controller 50 may stop an operation of transferring a wafer W. In addition, the controller 50 may suppress heat transfer from a chamber by reducing a time that is taken to transfer a wafer W from the chamber of the substrate processing apparatus.

In addition, in the embodiment, it was exemplified that one through-hole 31b is formed at the first gear 31, but the present disclosure is not limited thereto. For example, a plurality of through-holes 31b may be formed. In addition, the through-hole 31b may be formed in an arc shape having a radially uniform width and a circumferentially long length. In addition, a slit may be formed as the transmission portion at the first gear 31 and the detector 61c may detect the temperature of the second gear 32 through the slit of the first gear 31. In addition, a through-hole or a slit may be formed also at the second gear 32 as a transmission portion. In addition, the detector 61c may directly detect the temperatures of the vacuum seals 41 and 42 through the through-hole 31b or the slit of the first gear 31 and the through-hole or the slit of the second gear 32.

In addition, although the multi-joint robot was exemplified as the transfer apparatus in the embodiment, the present disclosure is not limited thereto. The transfer apparatus may be implemented in other ways as long as it transfers substrates by rotating arms.

According to the present disclosure, it is possible to directly measure the temperature of the gears at the joints.

While certain embodiments have been described, these embodiments have been presented by way of example only, and are not intended to limit the scope of the disclosures. Indeed, the embodiments described herein may be embodied in a variety of other forms. Furthermore, various omissions, substitutions, and changes in the form of the embodiments described herein may be made without departing from the spirit of the disclosures. The accompanying claims and their equivalents are intended to cover such forms or modifications as would fall within the scope and spirit of the disclosures.

What is claimed is:

1. A transfer apparatus comprising:
   at least one arm configured to support a substrate;
   at least one gear disposed at a joint that rotatably supports the at least one arm, the at least one gear rotating the at least one arm; and
   a detector disposed to face the at least one gear and configured to detect a temperature of the at least one gear without contacting the at least one gear,
   wherein the at least one arm comprises two arms, and end portions of the two arms are supported and overlap each other at the joint,
   wherein the at least one gear comprises two gears coaxially disposed to correspond to the two arms, each of the two gears configured to rotate a corresponding arm of the two arms, and a transmission portion being formed at a first gear of the two gears, and
   wherein the detector is disposed to be closer to the first gear than a second gear of the two gears to face the first gear, is configured to detect a temperature of the first gear from a portion where the transmission portion is not formed at the first gear, and is configured to detect a temperature of the second gear through the transmission portion of the first gear.

2. The transfer apparatus of claim 1, further comprising a controller configured to control rotation of the two arms,
   wherein the transmission portion is formed at a position of the first gear, and the position faces the detector when a predetermined arm of the two arms is positioned at a predetermined rotational position by rotation of the predetermined arm, and
   the controller is configured to control such that the predetermined arm is positioned at the predetermined rotational position when the temperature of the second gear is detected.

3. The transfer apparatus of claim 2, wherein the at least one arm is hermetically configured, and
   the joint is sealed by a vacuum seal provided on an axis of the at least one gear.

4. The transfer apparatus of claim 3, wherein when a temperature of one gear of the two gears detected by the detector exceeds a predetermined tolerance range, the controller is configured to control one arm of the two arms that is rotated by the one gear to stop and control the other arm of the two arms that is different from the one arm to transfer a substrate.

5. The transfer apparatus of claim 4, wherein the detector is disposed to face an end surface of the at least one gear and is configured to detect a temperature of the end surface without contacting the end surface.

6. The transfer apparatus of claim 1, wherein the at least one arm is hermetically configured, and
   the joint is sealed by a vacuum seal provided on an axis of the at least one gear.

7. The transfer apparatus of claim 2, wherein the controller is configured to output a warning when the temperature of the at least one gear detected by the detector exceeds a predetermined tolerance range.

8. The transfer apparatus of claim 2, wherein when a temperature of one gear of the two gears detected by the detector exceeds a predetermined tolerance range, the controller is configured to control one arm of the two arms that is rotated by the one gear to stop and control the other arm of the two arms that is different from the one arm to transfer a substrate.

9. The transfer apparatus of claim 1, wherein the detector is disposed to face an end surface of the at least one gear and is configured to detect a temperature of the end surface without contacting the end surface.

\* \* \* \* \*